United States Patent
Kobayashi

(10) Patent No.: US 6,540,405 B2
(45) Date of Patent: Apr. 1, 2003

(54) ULTRATHIN-WALLED ROLLING BEARING

(75) Inventor: Umemitsu Kobayashi, Kuwana (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/946,131

(22) Filed: Sep. 5, 2001

(65) Prior Publication Data

US 2002/0037123 A1 Mar. 28, 2002

(30) Foreign Application Priority Data

Sep. 8, 2000 (JP) .......................... 2000-273691

(51) Int. Cl.$^7$ .............................................. F16C 19/06
(52) U.S. Cl. ....................... 384/450; 384/516; 384/517; 384/537
(58) Field of Search ................... 384/450, 516, 384/517, 537, 569

(56) References Cited

U.S. PATENT DOCUMENTS

| | | |
|---|---|---|
| 5,363,262 A | 11/1994 | Drennan |
| 5,491,598 A | 2/1996 | Stricklin et al. |
| 5,495,375 A | 2/1996 | Baasch et al. |
| 5,557,839 A | 9/1996 | Mastache et al. |
| 5,579,190 A | 11/1996 | Mastache et al. |
| 5,631,789 A | 5/1997 | Dion et al. |
| 5,691,581 A | 11/1997 | Umehara et al. |
| 5,731,934 A | 3/1998 | Brooks et al. |
| 5,768,064 A | 6/1998 | Baasch et al. |
| 5,808,840 A | 9/1998 | Ishimatsu |
| 5,844,754 A | 12/1998 | Stefansky et al. |
| 5,862,019 A | 1/1999 | Larson |
| 6,464,397 B2 * | 10/2002 | Kobayashi .................. 384/450 |

* cited by examiner

*Primary Examiner*—Lenard A. Footland
(74) *Attorney, Agent, or Firm*—Arent Fox Kintner Plotkin & Kahn

(57) ABSTRACT

The arrangement is such that the ratio of the diameter of balls 3 in the ultrathin-walled ball bearing to the pitch circle diameter PCD is not more than 0.03, and that the balls 3 are arranged in a single row and in two-point contact with the raceway surfaces 1a and 2a of the outer and inner members 1 and 2. The inner member 2 is composed of first and second raceway rim members 21 and 22 opposed to each other with an axial clearance S defined therebetween, and the internal clearances of the bearing are made negative by adjusting the width of the axial clearance S.

6 Claims, 4 Drawing Sheets

ULTRATHIN-WALLED ROLLING BEARING

BACKGROUND OF THE INVENTION

1. Field of the Invention

The present invention relates to an ultrathin-walled rolling bearing used in industrial robots, machine tools, medical instruments, etc.

2. Prior Art

FIG. 6 shows an example of a CT scanner, which is a kind of medical instrument. As shown, the CT scanner device is so designed that X-rays generated by an X-ray tube assembly 50 are radiated to a subject 53 through a wedge filter 51 for uniformizing intensity distribution and through a slit 52 for restricting intensity distribution. The X-rays passing through the subject 53 is received by a detector 54, converted into electric signals, which are sent to an unillustrated computer. Such parts as the X-ray tube assembly 50, wedge filter 51, slit 52, and detector 54 are mounted on a substantially cylindrical rotatable block 57 rotatably supported through a rolling bearing 55, and the rotary driving of said rotatable block 57 causes rotation of the parts around the subject 53. In the CT scanner device, the rotary movement of the X-ray tube assembly 50, and detector 54 opposed thereto around the subject 53 provides projection data covering all angles at every point in the inspection cross-section of the subject 53, and a tomogram is obtained from these data through a reconstructive program prepared in advance.

In this CT scanner device, the inner peripheral surface of a stationary block 56 disposed inside the rotatable block 57 is formed to have a sufficiently large diameter (about 1 m in diameter), to receive the subject 53, so that a so-called ultrathin-walled roller bearing, which is very small in cross-section for its diameter, is used as the bearing 55 disposed between the stationary block 56 and the rotatable block 57.

Heretofore, the four-point contact ball bearing, which is capable of supporting a high-moment load acting in opposite directions by using a single bearing and which saves space, has been mainly used as the rolling bearing 55 particularly of the low speed rotation type (about 60–90 rpm) for this CT scanner device. Conventionally, for the sake of assembly, the internal clearances for four-point contact ball bearings are set at 0 or above, of which clearances, the radial internal clearance, for example, is set often in the range of 0.005–0.050 mm in consideration of machining error, etc.

In recent CT scanner devices, further reduction of vibration and improvements in acoustic characteristics are desired from the standpoints of lightening patient's burden, improving radiographic accuracy, etc. With the conventional construction, however, these desires cannot be fully met and further improvements are desired.

SUMMARY OF THE INVENTION

Accordingly, an object of the invention is to achieve reduction of vibration and improvements in acoustic characteristics of ultrathin-walled rolling bearings, at low cost.

To achieve said object, the invention provides an ultrathin-walled rolling bearing including an outer member having a raceway surface in the inner periphery, an inner member having a raceway surface in the outer periphery, a plurality of rolling elements interposed between the raceway surfaces of the outer and inner members, and a cage for holding the rolling elements in circumferentially equispaced relationship, wherein the ratio of the diameter of the rolling elements to the pitch circle diameter of the bearing is not more than 0.03, the rolling elements are arranged in a single row, being in two-point contact with each of the raceway surfaces of the outer and, inner members, and the internal clearances of the bearing are made negative.

This bearing is a so-called four-point contact rolling bearing, and in this type of bearings, when the internal clearances are made negative, play between the rolling elements disappears. Therefore, the bearing rigidity improves and reduction of noise and vibration due to play between the balls is achieved.

In this case, if one of the inner and outer members is fixed to the rotatable block of a CT scanner device rotating around a subject and the other to the stationary block thereof, then reduction of patient' burden which is brought about by reduction of noise and vibration of said rolling bearing, and improved radiographic accuracy can be achieved.

By constituting one of the inner and outer members by first and second raceway members opposed to each other on the opposite sides of the axial clearance, and adjusting the width of the axial clearance, the internal clearances of the bearing can be made negative by simple means and at low cost. The adjustment of the width of the axial clearance is made by axially relatively moving the first and second raceway members.

Further, by eliminating the difference in the amount of thermal expansion after the rolling element have been installed between the inner and outer members which differ in the amount of thermal expansion, the internal clearances of the bearing can also be made negative by simple means and at low cost.

DESCRIPTION OF THE PREFERRED EMBODIMENTS

Embodiments of the invention will now be described with reference to FIGS. 1 through 6.

Figure 1:
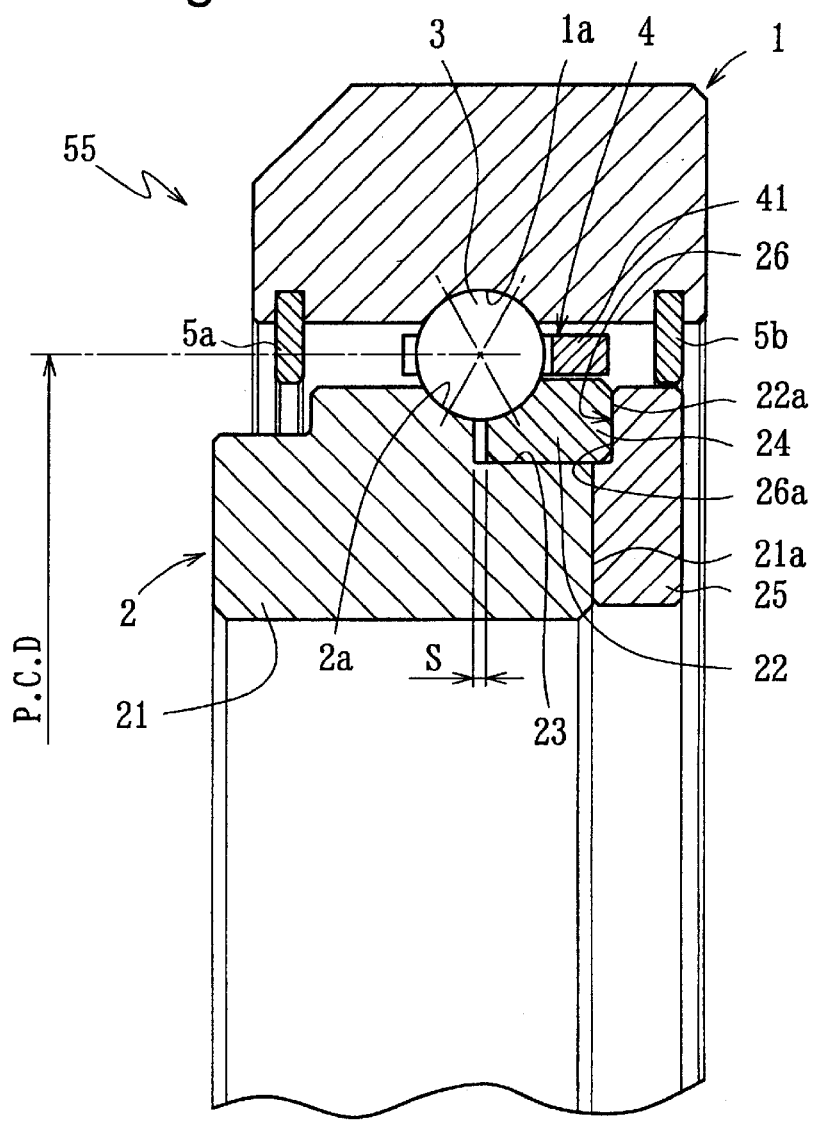
FIG. 1 is a sectional view of an ultrathin-walled rolling bearing according to the invention.
Figure 2:
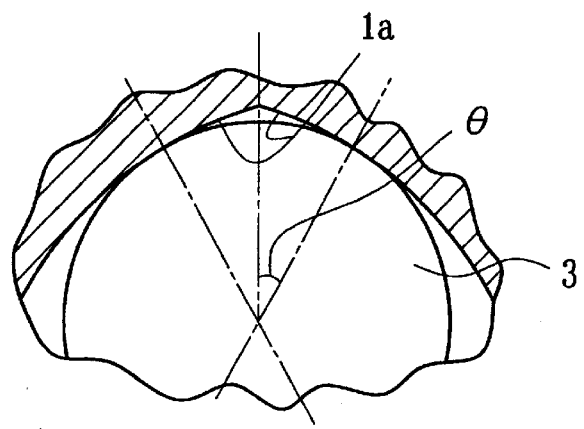
FIG. 2 is an enlarged sectional view of the main portion of said rolling bearing.
Figure 6:
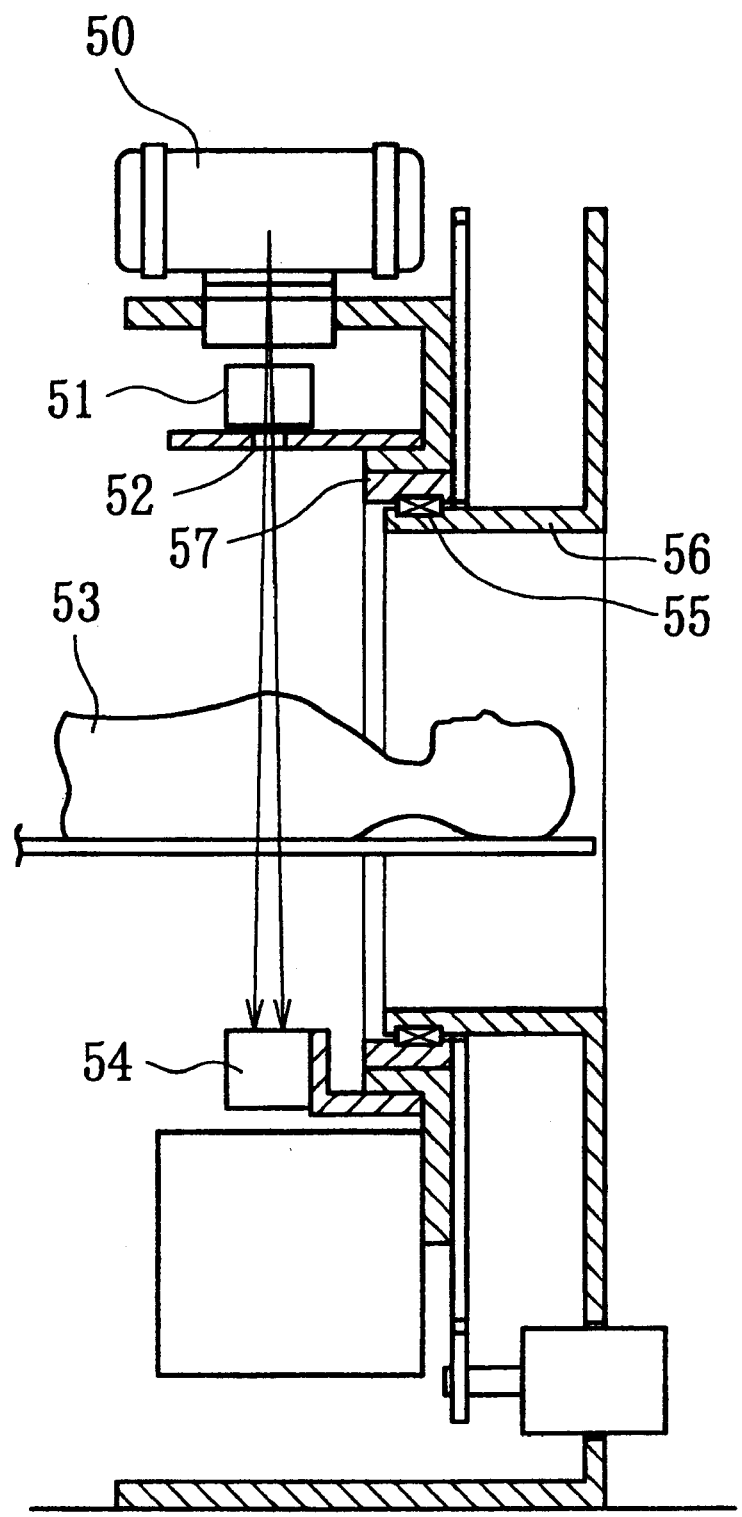
FIG. 6 is a sectional view showing the outline construction of a CT scanner device.

FIG. 1 shows an example of a ultrathin-walled rolling bearing, and is a sectional view of a bearing 55 used in a CT scanner device shown in FIG. 6. This bearing 55 comprises an annular outer member 1 having a single-row raceway surface 1a in the inner periphery, an annular inner member 2 disposed inside and concentrically with the outer member 1 and having a single-row raceway surface 2a in the outer periphery, a plurality of rolling elements 3 interposed in a single row between the raceway surfaces 1a and 2a of the outer and inner members 1 and 2, a cage 4 for holding the rolling elements 3 at equal circumferential intervals, and seal devices 5a and 5b which seal the opposite end openings in the bearing in a contactless manner.

This bearing 55 is a ultrathin-walled rolling bearing in which the ratio φ of the diameter $d_B$ of the balls 3 to the pitch circle diameter PCD is not more than 0.03 ($\phi=d_B/PCD \leq 0.03$). For example, the ball diameter is set at ½ inch (12.7 mm), PCD is set at 1041.4 mm, and their ratio $\phi$ is set at 0.012. The present invention is applied mainly to large bearings whose PCD is about 500–1500 mm.

Further, this bearing 55 is a four-point contact ball bearing in which the balls 3 make two-point contact with each of the raceway surfaces 1a and 2a of the two members 1 and 2 (correctly, the balls 3 under pure radial load make two-point contact with each of the two raceway surfaces 1a and 2a). This four-point contact ball bearing, as shown enlarged in FIG. 2, has the two raceway surfaces 1a and 2a, for example, Gothic-arch shaped, that is, formed by using two arcs whose radius of curvature is smaller than that of the balls (the drawings show only one raceway surface 1a). The contact angle θ of this kind of bearing is set at θ=35°, for example.

Figure 3:
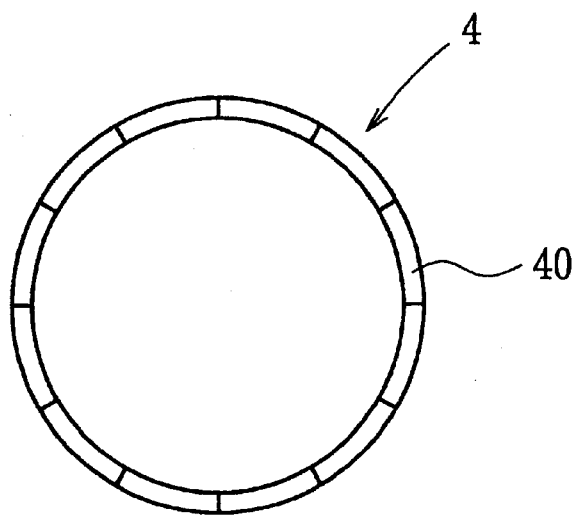
FIG. 3 is a front view showing the outline construction of a cage.

The cage 4 is, for example, of the split type in which, as shown in FIG. 3, a plurality of resin segments 40 arcuate in cross section are circumferentially joined together to form an annulus. Concave or convex fitting portions 44a and 44b (see FIG. 4) formed in the opposite ends of each segment 40 are fitted on/in the convex or concave fitting portions 44b and 44a of the ends of the mating segment; thus, the segments 40 are circumferentially engaged to be joined together.

Figure 4:
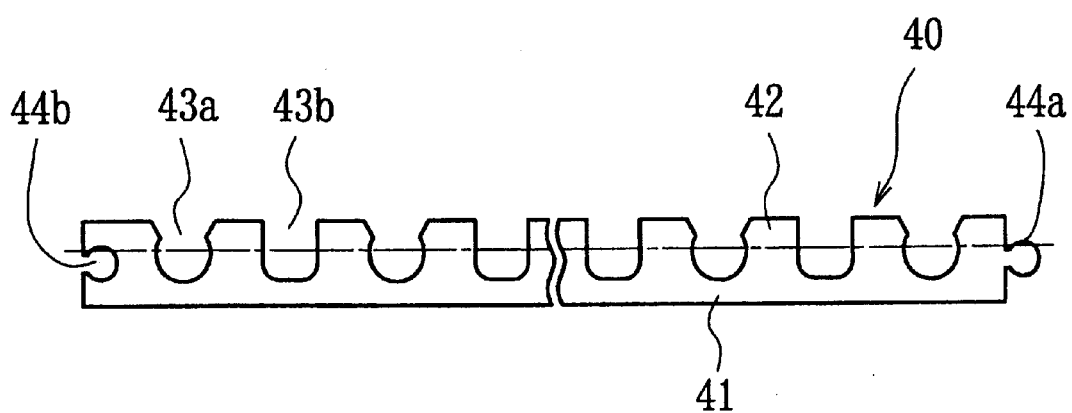
FIG. 4 is a developed plan view of a segment constituting the cage.

FIG. 4 is a developed plan view of segments 40. The illustrated segment 40 is substantially of the comb type comprising an arcuate base portion 41 obtained by dividing an annulus at a plurality of circumferential places, pillars 42 extending from the base portion 41 in one axial direction, and aplurality of pockets 43a, 43b formed between adjoining pillars 42. The illustrated pockets 43a and 43b have two kinds of shape, one of which is the first pocket 43a in which the wall surface on the pocket opening side rather than the central of the pocket is a concave arcuate surface as seen in a plan view and the other is the second pocket 43b in which said wall surface is axially straight surface as seen in a plan view. The first and second pockets 43a and 43b are circumferentially alternately arranged, and the wall surface of any of the pockets 43a and 43b has a radial section which is a concavely curved surface with its center of curvature located at the pocket center.

Reception of the balls 3 in the pockets 43a and 43b is effected by pushing the balls 3 into the innermost regions of the pockets through the axial openings in the pockets 43a and 43b. At this time, in the first pocket 43a, it is necessary to push in the ball 3 while forcing the pillars 42 on the inlet side to spread apart. In the second pocket 43b, however, such procedure is not required, so that the step of installing the balls 3 in the cage 4 can be simplified.

The shape and construction of the cage 4 described above are by way of example only, and pockets of various shapes and constructions, including a pocket of single shape, may be used depending on the service conditions of the bearing.

This resin segment 4 is produced by injection molding of a thermoplastic resin, such as polyamide 66, polyamide 46, polyphenylene sulfide or polyacetal, used as apparent material, with about 10–30% by weight of glass fiber added thereto to increase strength. In addition, particularly, in the case where sufficient elasticity is required for the cage 4 in connection with application, etc., an additive, such as glass fiber, need not be added. Of said thermoplastic resins, polyamide 66 is suitable for rolling bearings for CT scanner devices from the standpoints of cost, strength and functions such as chemical stability. In contrast therewith, in the case where temperature conditions become severer (higher temperatures) or where importance is attached to fatigue strength or rigidity, polyamide 46 is suitable; in the case where importance is attached to high temperature, chemical resistance, and dimensional stability with respect to humidity (hygroscopicity), polyphenylene sulfide is suitable; and in the case where importance is attached to wear resistance, polyacetal is suitable.

Grease is filled in the bearing, the filled amount being not less than 20% and not more than 50% of the overall space volume. If the filled amount exceeds 50%, the torque becomes too great. On the other hand, if the filled amount is less than 20%, anxiety arises about lubricity and besides this, the sound of collision due to contact of the cage 4 with the inner peripheral surface of the outer member 1 and the outer peripheral surface of the inner member 2 becomes louder when the two members contact each other, or other problems arise; for example, the life becomes shorter.

In the present invention, the internal clearances (radial internal clearance and axial internal clearance) of the bearing 25 are set at negative values. As for means for setting the internal clearances at negative values, various ones may be contemplated. A first embodiment thereof will now be described.

The inner member 2 is composed of a first raceway member 21 and a second raceway member 22. The outer peripheral surface on one end side of the first raceway member 21 is thereby formed with a smaller-diameter stepped portion 23, in/on which the annular second raceway member 22 is fixedly fitted. The fit between the first and second raceway members 21 and 22 is set to such a degree that during axial pressing, the two members 21 and 22 are rendered capable of axial relative movement and that during non-pressing, the two members 21 and 22 are reliably fixed. An axial clearance S is defined between the opposed end surfaces of the first and second raceway members 21 and 22. In the illustrated example, the axial clearance S is defined at an axial portion which substantially coincides with the center of the ball, and the outer peripheries of the first and second raceway members 21 and 22 disposed on both sides of the axial clearance S are respectively formed with a raceway surface 1a.

An end surface 22a (an end surface on one end side) opposite to the end surface of the second raceway member 22 opposed to the axial clearance S forms a projecting portion 24 which axially projects beyond an end surface 21a on one end side of the first raceway member 21. The end surface 21a on one end side of the first raceway member 21 has a pressing member 25 attached thereto through fastening means such as unillustrated bolts. The outer diameter end of the pressing member 25 is formed with a circumferential notch 26 for receiving the projecting portion 24 of the second raceway member 22, and the radial surface 26a of said notch 26 is in close contact with the end surface 22a on one end side of the second raceway member 22.

In the above construction, when the fastening means fitted in the pressing member 25 are tightened, the radial surface 26a of the pressing member 25 presses the projecting portion 24 of the second raceway member 22 against the other axial end side, pushing the second raceway member 22 into the bearing. This shortens the axial clearance S and presses the balls 3 against the raceway surface 1a side of the outer member 1, so that the radial and axial internal clearances are eliminated. At this point, the pressing member 25 is pushed inward until these internal clearances are rendered negative, thereby imparting preload to the bearing, whereupon the balls 3 have their play eliminated, thus increasing the bearing rigidity against moment load, etc., and achieving, at low cost, the inhibition of vibration caused by the play of the balls and improved acoustic characteristics. In the conventional construction, since the radial internal clearance is positive, the balls in their non-loaded sphere sometimes form a cause of noise. In the present invention, however, since the internal clearances are set at negative values as described above, bad effects of this kind can be prevented. In addition, preload adjustment can be accurately and easily made by presetting the width of the initial axial clearance t so that a predetermined amount of preload may be obtained when the axial clearance S becomes 0. Besides this, it is possible to provide a constant-pressure preload as by a method of controlling the tightening torque of the fastening means.

In addition, in the above embodiment, the entire periphery of the second raceway member 22 has been pressed by annularly forming the pressing member 25. However, the second raceway member 22 may be circumferentially locally pressed as by arranging pressing members 25 at a plurality of circumferential positions. Further, the arrangement in which the inner member 2 is divided into the first and second raceway members 21 and 22 has been shown by way of example. However, the same effectiveness may also be obtained by constructing the outer member 1 so that it is of similar split construction.

The outer member 1 is fixed to the rotatable block 57 of the CT scanner device show in FIG. 6 by using attaching means such as unillustrated bolts, while the inner member 2 is fixed on the stationary side by attaching the first raceway member 21 to the stationary block 56 as by using similar attaching means. From the above, it follows that the outer member 1 becomes a rotatable member rotating with the rotatable block 57 while the inner member 2 becomes a non-rotatable stationary member. Depending on the construction of the CT scanner device, the outer member 1 may, reversely, be on the stationary side and the inner member 2 on the rotatable side, rotating with the rotatable block 57.

The inner and outer members 2 and 1 described above are produced in the same manner as in, the inner and outer rings of an ordinary rolling bearing, through steps including forging, turning, heat treatment, and polishing. The outer and inner members 1 and 2 are attached to the CT scanner device by using attaching means such as bolts, as described above. In order to secure accuracy for fitting holes for these attaching means, the heat treatment of the two members 1 and 2 is effected usually by induction hardening, which causes less thermal deformation. As for the raw material of the first raceway member 21 of the inner member 2 and the outer member 1, it is desirable to use a carbon steel for machine construction, such as S50C (provided in JIS), in consideration of hardenability when induction hardening is performed and cost. On the other hand, for the raw material for the second raceway member 22 having no holes for said attaching means, it is desirable to use a high carbon chromium bearing steel such as SUJ2 (provided in JIS), from a cost-oriented point of view. The polishing included in the above steps is applied mainly to the raceway surfaces 1a and 2a. For further reduction of vibration and noise, the two raceway surfaces 1a and 2a are finished desirably such that their surface roughness is Ra=0.2 μm or below in terms of center line average height.

Conventionally, the inner and outer rings of a rolling bearing are fitted in their respective housings and the latter are bolted to the stationary block 26 and rotatable block 27 of the CT scanner device. However, the outer and inner members 1 and 2 shown in FIG. 1 are of the construction in which the inner and outer rings are integrated with their respective housings and these assemblies are attached directly to the stationary block 26 and rotatable block 27. In this case, as compared with the inner and outer rings separate from the housings, the inner and outer members 2 and 1 have their wall-thickness increased to have increased rigidity in the vicinity of the raceway surfaces 1a and 2a, so that deformation is hardly caused during processing. For this reason, processing accuracy is improved and the necessary sufficient circularity can be easily obtained. If this point does not become a special problem, the inner member 2 may, of course, be of separate construction, consisting of an inner ring and a housing (similarly, the outer member 1 may be of separate construction, consisting of an outer ring and a housing).

A second embodiment in which the internal clearances are made negative will now be described with reference to FIG. 5. The rolling bearing of this embodiment is also a single row four-point contact ball bearing similar to that of FIG. 1, and an arrangement which, except what is described below, is similar to that of FIG. 1 may basically be employed.

In this embodiment, the setting of the internal clearances is made by eliminating the difference in the amount of thermal expansion after the balls 3 and cage 4 have been installed between the inner and outer members 2 and 1 which differ in the amount of thermal expansion. In this case, the amount of thermal expansion should be greater for the outer member 1 than for the inner member 2. As for means for providing a difference in the amount of thermal expansion, some methods may be contemplated, including one in which a temperature difference is provided between the outer and inner members 1 and 2 (the outer member 1 is at higher temperature), and another in which the outer and inner members 1 and 2 are made of materials different in the amount of thermal expansion (the amount of thermal expansion of the outer member 1 is greater). In each case, the internal clearances can be made negative by zeroing the difference in the amount of thermal expansion as by cooling the two members after the balls 3 and cage 4 have been installed.

Figure 5:
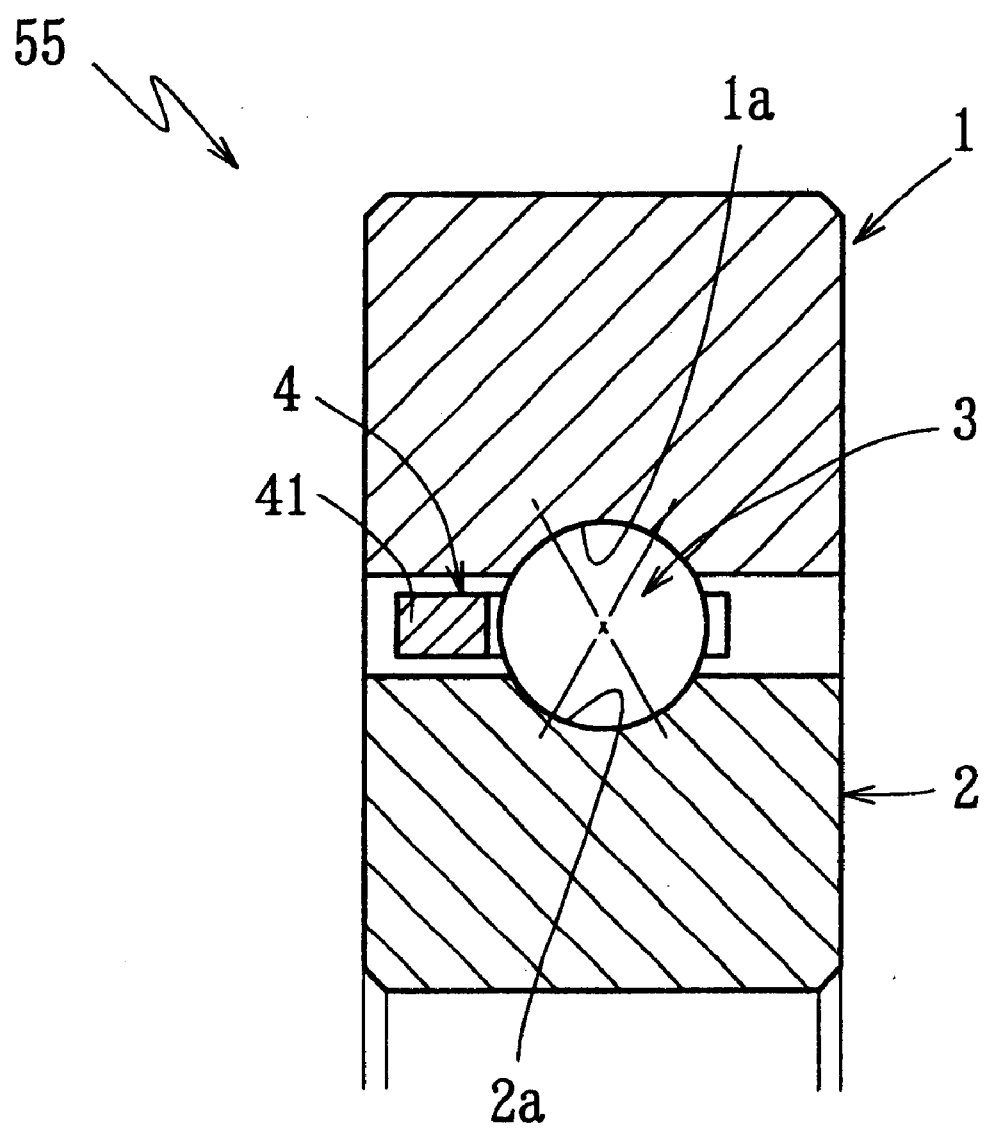
FIG. 5 is a sectional view of a second embodiment of the invention.

In this case, it is not necessary to divide the inner member 2 into the first and second raceway members 21 and 22 as shown in FIG. 1; it will be enough to make an integral construction as shown in FIG. 5. In addition, in FIG. 5, the seal members 5a and 5b are omitted from the illustration.

Since the ultrathin-walled rolling bearing according to the invention is of a single row four-point contact type making the internal clearances of the bearing negative, the balls 3 are free from play and it is possible to improve bearing rigidity, and to reduce vibration and noise. Therefore, when this bearing is used in a CT scanner device, it is possible to lighten patient's burden, to improve radiographic accuracy, and so on.

What is claimed is:

1. An ultrathin-walled rolling bearing including an outer member having a raceway surface in the inner periphery, an inner member having a raceway surface in the outer periphery, a plurality of rolling elements interposed between the raceway surfaces of the outer and inner members, and a cage for holding the rolling elements in circumferentially equispaced relationship, wherein the ratio of the diameter of the rolling elements to the pitch circle diameter of the bearing is not more than 0.03, the rolling elements are arranged in a single row, being in two-point contact with each of the raceway surfaces of the outer and inner members, and the internal clearances of the bearing are made negative.

2. An ultrathin-walled rolling bearing according to claim 1, wherein one of the inner and outer members is fixed to the rotatable block of a CT scanner device rotating around a subject and the other to the stationary block thereof.

3. An ultrathin-walled rolling bearing according to claim 1 or 2, wherein one of the inner and outer members comprises first and second raceway members opposed to each other on the opposite sides of the axial clearance, and the internal clearances of the bearing are made negative by adjusting the width of said axial clearance.

4. An ultrathin-walled rolling bearing according to claim 1 or 2, wherein after the rolling elements have been installed between the inner and outer members which differ in the amount of thermal expansion, their difference in the amount of thermal expansion is eliminated, thereby making the internal clearances of the bearing negative.

5. A method of producing the ultrathin-walled rolling bearing described in claim 1 or 2, wherein one of the inner and outer members comprises first and second raceway members opposed to each other on the opposite sides of the axial clearance, said first and second raceway members being axially relatively moved to adjust the width of the axial clearance, thereby making the internal clearances of the bearing negative.

6. A method of producing the ultrathin-walled rolling bearing described in claim 1 or 2, wherein after the rolling elements have been installed between the inner and outer members which differ in the amount of thermal expansion, their difference in the amount of thermal expansion is eliminated, thereby making the internal clearances of the bearing negative.

* * * * *